United States Patent [19]
Young et al.

[11] Patent Number: 5,303,970
[45] Date of Patent: Apr. 19, 1994

[54] OVERHEAD CONSOLE FOR A VEHICLE WITH A SUNROOF

[75] Inventors: Nathan W. Young; Robert B. Bieri; David B. Busch, all of Holland; Scott S. Bainbridge, Byron Center; James T. Hotary, Holland, all of Mich.

[73] Assignee: Prince Corporation, Holland, Mich.

[21] Appl. No.: 985,621

[22] Filed: Dec. 3, 1992

[51] Int. Cl.⁵ .............................. B60R 7/00; B60J 7/00
[52] U.S. Cl. .................................. 296/37.7; 296/216; 224/311
[58] Field of Search ...................... 296/214, 216, 37.7, 296/37.8; 224/311, 315

[56] References Cited

U.S. PATENT DOCUMENTS

| | | | |
|---|---|---|---|
| 1,726,257 | 8/1929 | Carlisle | 296/37.7 |
| 1,927,735 | 9/1933 | Carlisle | 296/37.7 |
| 2,219,076 | 10/1940 | Marzilli | 296/37.7 |
| 2,236,428 | 3/1941 | Haas | 296/37.7 |
| 3,078,122 | 2/1963 | Werner | 296/216 |
| 3,536,353 | 10/1970 | Goodacre | 280/756 |
| 4,089,542 | 5/1978 | Westerman | 280/756 |
| 4,161,336 | 7/1979 | Levan et al. | 296/218 |
| 4,367,454 | 1/1983 | Modica | 296/218 |
| 4,441,641 | 4/1984 | Thompson | 224/311 |
| 4,800,803 | 1/1989 | Farmont | 296/216 |
| 4,801,174 | 1/1989 | Hirshberg et al. | 296/216 |
| 4,872,722 | 10/1989 | Farmont | 296/214 |
| 4,888,538 | 7/1989 | Ricks | 296/217 |
| 4,968,088 | 11/1990 | Schurmann | 296/216 |

FOREIGN PATENT DOCUMENTS

| | | |
|---|---|---|
| 1103777 | 2/1957 | Fed. Rep. of Germany . |
| 3417983 | 11/1985 | Fed. Rep. of Germany . |
| 63-265725 | 11/1988 | Japan . |
| 3-114925 | 5/1991 | Japan . |
| 8801949 | 3/1988 | PCT Int'l Appl. . |
| 2218386 | 11/1989 | United Kingdom . |

*Primary Examiner*—Dennis H. Pedder
*Attorney, Agent, or Firm*—Price, Heneveld, Cooper, DeWitt & Litton

[57] ABSTRACT

An accessory mounting system for mounting an accessory such as an overhead console to a vehicle opening such as a sunroof opening includes a pair of spaced, opposed mounting sockets being adjustable with respect to one another to span and engage opposite lower edges of the vehicle opening. In a preferred embodiment of the invention, one of the sockets is mounted on a rail which is telescopically adjustable with respect to the other socket and an incrementally adjustable locking mechanism allows the sockets to be finally locked into compression for removably holding the console in place. The sockets, in a preferred embodiment, include concave sockets with relatively thin upper members to engage the sunroof opening without interfering with its normal operation.

22 Claims, 5 Drawing Sheets

OVERHEAD CONSOLE FOR A VEHICLE WITH A SUNROOF

BACKGROUND OF THE INVENTION

The present invention relates to an overhead console and one which can be added to a vehicle having an existing sunroof opening.

Many vehicles include, either as standard equipment or as an option, an overhead console which provides for storage of sunglasses and other items and vehicle accessories such as garage door opening transmitters, overhead lights, compass displays and the like. Typically, vehicles with sunroofs are limited to a relatively small area between the windshield and the forward edge of the sunroof opening in which maplamps can be mounted but which space is relatively small and cannot accommodate features of larger overhead consoles available in vehicles without a sunroof. In some areas of the country, such as in the northern climates, sunroofs are typically usable only during summer months. Thus, during a large portion of the year, individuals having vehicles with sunroofs are deprived of the convenience of an overhead console which is generally available in vehicles not having a sunroof option.

SUMMARY OF THE PRESENT INVENTION

The console of the present invention provides an owner of a vehicle having a sunroof with the option of adding a console which can be mounted directly to the sunroof opening without modifying the vehicle or interfering with the sunroof operation for use of the console year-round, or if preferred, only during months where the sunroof is not being employed. The design of the console does not significantly obstruct the sunroof area and yet provides conveniently located storage features not otherwise available to such vehicle owners in the past.

An overhead console embodying the present invention includes a pair of spaced mounting sockets facing in opposed directions and being adjustable with respect to one another to span and engage opposite lower edges of a vehicle sunroof opening. The sockets are attached to a housing including one or more storage areas In a preferred embodiment of the invention, one of the socket means is movable and is mounted on a rail which is telescopically adjustable with respect to the other socket means. Adjustment and locking means coupled to the rail allow for the adjustment and locking of the movable socket means to compressibly engage the opposite edges of various sized sunroof openings for holding the console in fixed engagement with the sunroof opening.

In a preferred embodiment of the invention, the console includes storage means such as a sunglass storage pocket. In another preferred embodiment of the invention, the storage means includes a removable pouch for carrying larger items. In all embodiments, the console can be added to an existing vehicle by the vehicle owner without the need for special tools or modification of an existing vehicle. The socket means, in a preferred embodiment, includes concave sockets with relatively thin upper members to engage the sunroof opening without interfering with its normal operation.

These and other features, objects and advantages of the present invention will become apparent upon reading the following description thereof together with reference to the accompanying drawings in which:

DETAILED DESCRIPTION OF THE PREFERRED EMBODIMENT

Figure 1:
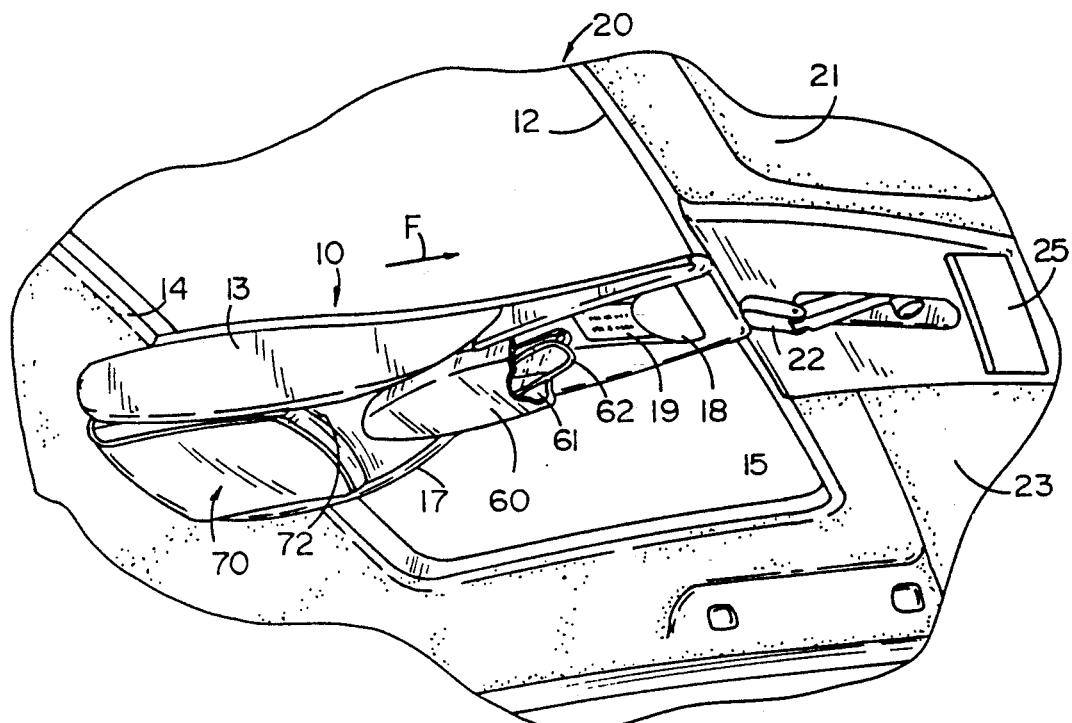
FIG. 1 is a fragmentary, perspective view of a vehicle including a console embodying the present invention.

Referring initially to FIG. 1, there is shown a console 10 embodying the present invention which is mounted between the forward edge 12 and rearward edge 14 of a sunroof opening 15 of a vehicle 20 such as an automobile. The vehicle may include a manual crank arm 22 for controlling the sunroof (shown in an open position) or can include an electrically operated sunroof installed and controlled electrically in a conventional manner. The vehicle 20 includes a pair of visors 21 and 23 located on opposite sides of a center forward module which includes sunroof control 22 and maplamps 25 for providing illumination for the vehicle operator and passenger.

Figure 6:
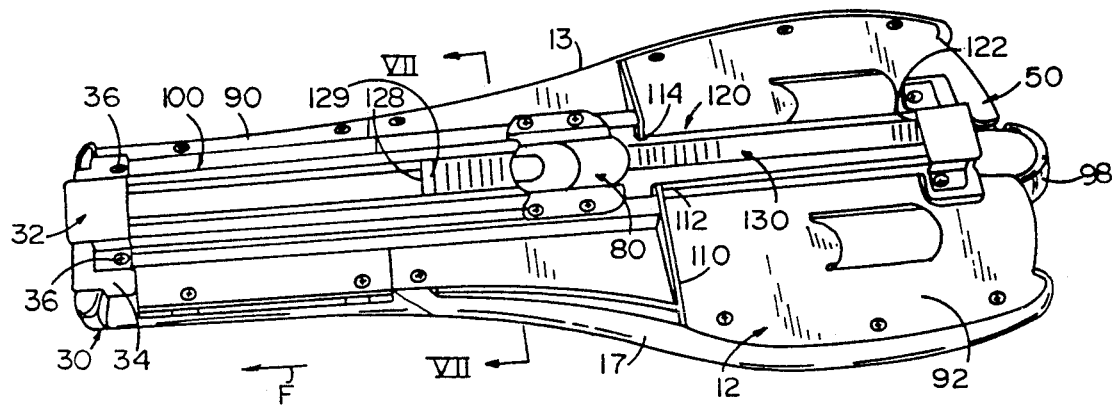
FIG. 6 is an enlarged, perspective top view of the console shown removed from the vehicle.

The console 10 embodying the present invention includes a base 12 (FIGS. 2 and 6) which is generally a flat, elongated plate extending, as best seen in FIG. 1, beyond the edges of opening 15 of the sunroof to provide a greater storage area for articles in the console 10. The base 12 includes a fixed socket assembly 30 located at the forward end of the console and an adjustable socket assembly 50 facing toward its rearward end as seen in FIG. 6. Mounted to the base 12 and cooperating between the base and the movable socket 50 is adjustment means 80 (FIGS. 2, 6 and 8-13) which allows the selective positioning of the rearward socket means 50 between a variety of positions with the structure being shown in FIG. 6 in its substantially fully extended position.

Figure 2:
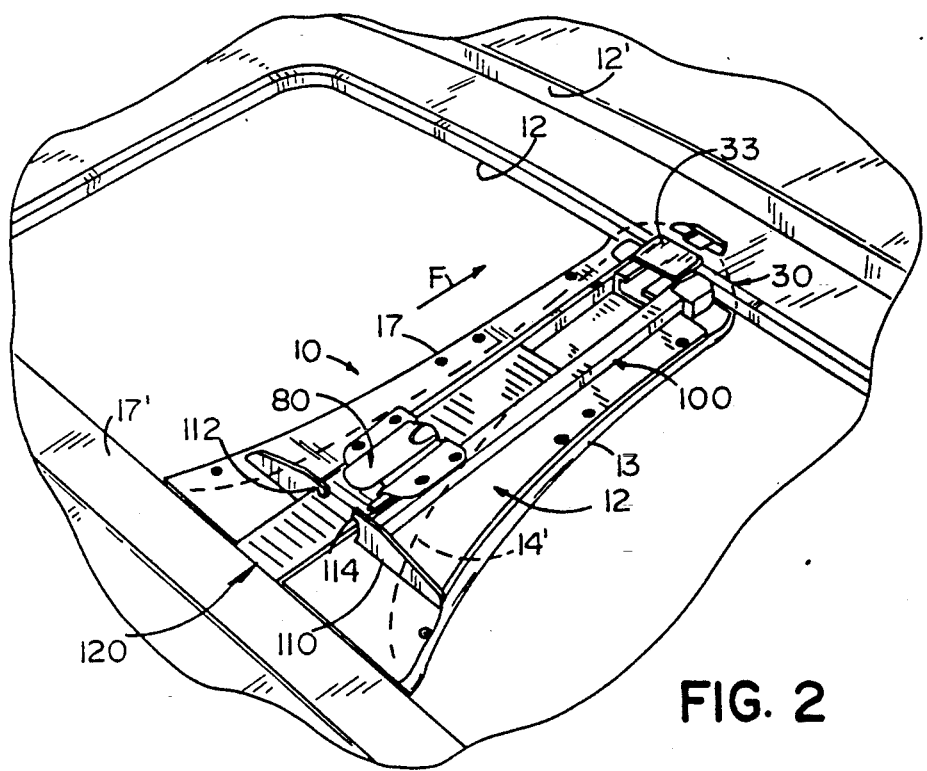
FIG. 2 is a perspective view of the console shown in FIG. 1 shown from above the vehicle.

In FIG. 2, the vehicle's sunroof 17' is shown in an open position with its forward edge being exposed. As can be seen, the console lies under the movable sunroof 17' which clears and does not interfere with the console 10 during operation of the sunroof. Arrow F in all of the Figures points in the forward direction of the vehicle 20 to orient the reader as to the various views shown. A decorative cover 14' shown in phantom form in FIG. 2, comprises a molded, polymeric, opaque cover which extends over and covers the mounting mechanism which is visible in FIGS. 2 and 6. Cover 14 may be a vacuum formed polymeric cover which snaps over base 12 as seen also in FIG. 7. Also attached to base 12 are decorative side panels 13 and 17 to provide a trim appearance to the console as seen in FIG. 1.

In a preferred embodiment of the invention, the base 12 includes at its forward end, an integrally molded clip 18 for receiving relatively small items such as a credit card 19 or the like, a storage pouch 60 for storing items such as sunglasses 62, and a removable pouch 70 which may include a zipper opening 72 for allowing storage of larger items in the vehicle. Console 10 may also include other storage or optional features and, if desired, electrical conductors from the vehicle's electrical system can be supplied to the removable console such that options such as lights, compasses or other vehicle accessories could be included with the console, if desired. In the preferred embodiment shown, however, the console is primarily a storage console for providing additional convenient storage for the vehicle operator and user. Having briefly described the major components of the console 10, a more detailed description of its construction is now presented in connection with FIGS. 2-7 followed by a sequence of operation for the installation of the console as shown in FIGS. 8-13.

Figure 3:
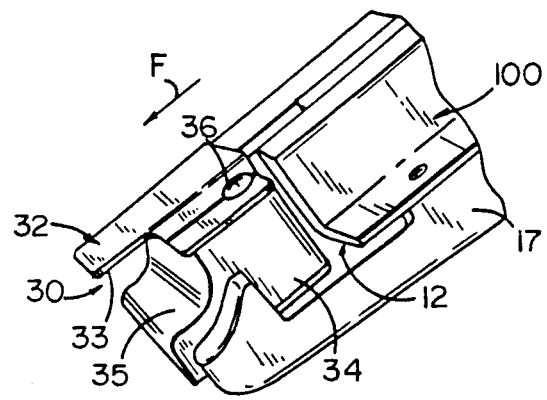
FIG. 3 is an enlarged, fragmentary, perspective view of the front of the console shown in FIGS. 1 and 2.
Figure 4:
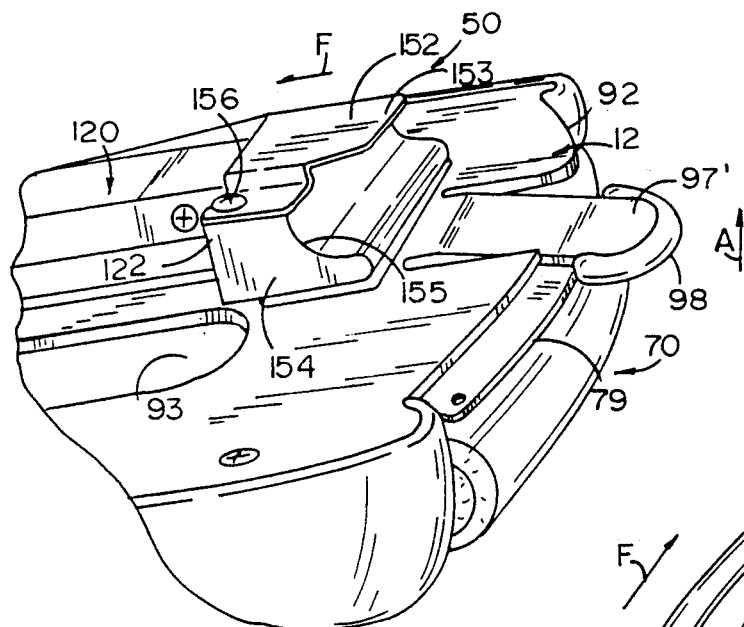
FIG. 4 is an enlarged, fragmentary, perspective view of the rear of the console shown in FIGS. 1 and 2.
Figure 5:
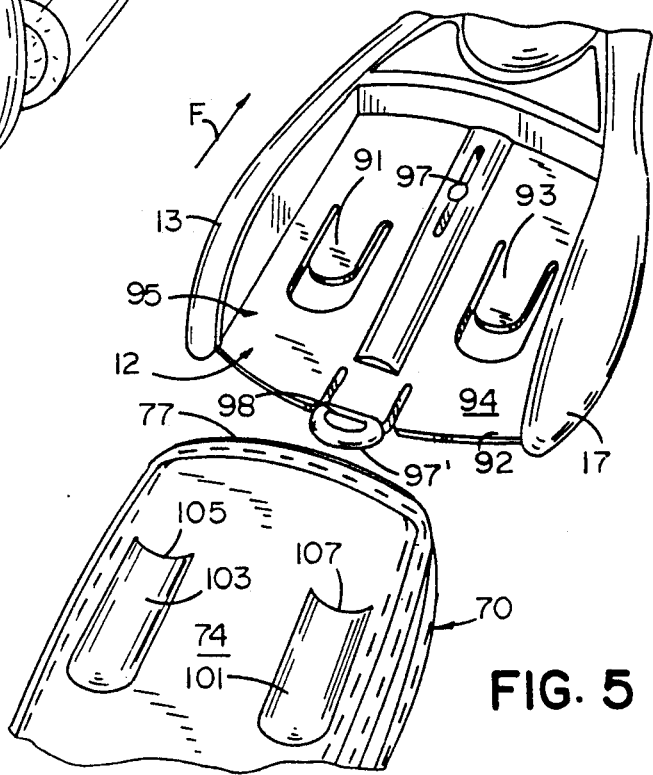
FIG. 5 is a fragmentary, perspective and exploded view of the removable storage container shown in FIGS. 1 and 4.

The base 12 comprises the substantially planar plate which can be molded of a suitable polymeric material such as polycarbonate or the like and has a violin-shaped appearance, as best seen in FIG. 6 with a narrowed throat or forward end 90 and a widened aft end 92. The fixed socket means 30 is mounted to the extreme forward edge of the base 12 as best seen in FIG. 3 and comprises a raised, relatively thin metal plate 32 having a flat lip 33 which overlies the forward edge of the sunroof opening as seen in FIG. 2. It is noted here that the forward edge 12 of sunroof opening 15 as seen in FIG. 2 is the dimension seen from within the vehicle with the sunroof opening into which the sunroof 17' itself seals on the vehicle exterior being larger by a distance slightly forwardly as indicated by edge 12' in FIG. 2. Thus, the plate 33 lies under the roof opening and attaches to the vehicle interior support surrounding the inside of the sunroof opening which provides adequate support for the console 10. Plate 32 is secured to a block 34 having a generally concave, forwardly facing opening 35 which engages the trim surrounding sunroof opening 15 of the vehicle. Fastening screws 36 attach the plate 32 to the support block 34 which can be integrally molded to the base 12 if desired.

Figure 7:
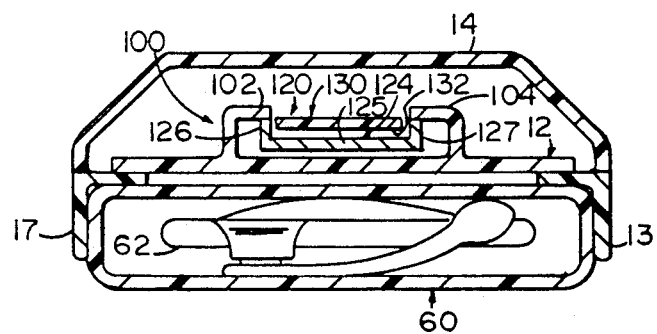
FIG. 7 is a enlarged, cross-sectional view of the console taken along section lines VII—VII of FIG. 6.

A generally inverted U-shaped channel 100 extends from adjacent the rearward edge of block 34 rearwardly as best seen in FIGS. 2 and 6 terminating in a partitioning wall 110 having, as best seen in FIG. 2, a pair of inwardly projecting lips 112 and 114 which extend over a telescopic guide rail assembly 120 to which the movable socket 50 is attached as described in greater detail below. Channel 100, as best seen in FIG. 7, can be integrally molded with the base 12 and includes a first upwardly and inwardly extending, generally reversed, inverted- L-shaped leg 102 and a second upwardly and inwardly extending, generally L-shaped leg 104 which also captively holds the telescopic rail 120 within the channel for various positions of adjustment of the movable socket 50. The adjustment means is described in greater detail below in connection with FIGS. 7-13, preceded by a description of the storage features of the console shown in FIGS. 1, 5 and 6, now described.

The rearward end 92 of base 12 includes a pair of integrally molded spaced spring tangs 91 and 93 formed to extend in spaced relationship from the widened floor 94 of the base 12 which defines an opening 95 between sides 13 and 17. Tangs 91 and 93 fit within pockets 101 and 103 formed in the solid floor 74 of removable pouch 70 which is shown in an inverted position in FIG. 5 to show the alignment relationship of the members. Thus, tang 93 fits within the open end 105 of pouch 103 and tang 91 fits within the open end 107 of pouch 101 when the pouch is inverted and slid into opening 95. A sliding spring-loaded post 97 is mounted to the floor 94 of the base and engages the forward edge 77 of pouch 70 when installed to urge the pouch from the stored position when the release lever 97' (FIG. 4) is pushed upwardly. Lever 97' is integrally formed on the rear edge of end 92 of base 12 and is pressed upwardly to release the removable pouch 70. Tang or lever 97' includes a raised handle 98 which engages the rear edge 79 (FIG. 4) of the pouch when inserted to lock the pouch in a stored position as seen in FIG. 1. The pouch includes a zipper opening 72 for allowing access to the pouch when in its stored position, as shown in FIG. 1 For greater access, tang 97 can be moved upwardly in a direction indicated by Arrow A in FIG. 4 for removing the pouch 70 completely from the console 10. The sunglass storage case 60 can be integrally attached to the base 12 as seen in FIG. 7 and includes an opening 61 (FIG. 1) with a concave lip for permitting access for storage and removal of sunglasses 62. Pouch 60 can be made of a resilient polymeric material such as polyvinylchloride and may be flexible to allow ease of use and yet snugly hold sunglasses therein. The mounting structure for the console including the opposed, movable, adjustable socket 50 and the stationary socket 30 is now described in connection with FIGS. 4, 6 and 7.

The movable socket 50 (like socket 30) also includes a thin upper metallic plate 152 which is secured to a block 154 having a concave, curved, rearwardly facing surface 155 which engages the edge 14 of the sunroof opening 15. Plate 152 has a tang 153 which, like tang 33 of socket 30, overlies the upper inner edge of the sunroof opening surrounding support within the vehicle below the sunroof 17' itself. Fastening means such as screws 156 are employed to attach the thin plate 152 to the supporting block 154 which is integrally attached to one end 122 of the telescopic rail 120 and movable with the rail.

As best seen in FIGS. 6 and 7, rail 120 includes a generally shallow, U-shaped, elongated member 124 having a horizontally extending base 125 with spaced, upwardly extending stub legs 126 and 127. As best seen in FIG. 7, legs 126 and 127 underlie the inwardly projecting lips 102 and 104 of channel 100 and therefore are captively but slidably held within the channel 100 assisted by the support of edges 112 and 114 as also seen in FIGS. 2 and 6. Rail 120 extends forwardly, terminating at an opposite end 128 to which there is pivotally mounted a flexible strap 130 which overlies rail base 125 and extends rearwardly substantially toward end 122. Strap 130 is pivotally mounted to rail 120 at its forward end by a pivot block 129 (FIG. 8) and has an opposite free end which terminates immediately adjacent socket 50 as seen in FIG. 6. Strap 30 is integrally molded with pivot block 29 which includes a transversely extending pivot pin 131 molded therein for pivotally mounting the block to and between legs 126 and 127 of rail 120 as shown in phantom form in FIGS. 8 and 9. Strap 130 includes a smooth, flat, lower surface 132 (FIG. 7) and a plurality of forwardly inclined ratchet teeth 134 on the upper surface.

The strap extends through a double pivoted, overcenter latching buckle defining the adjustment means 80 for the compressive mounting of the sockets 30 and 50 of console 10 to the vehicle. Like the remaining components of the console, strap 130 can be made of a structural polymeric material such as polycarbonate or the like. Thus, the rail 120 and its associated strap 130 telescopically slides within channel 100 between a fully extended position as illustrated in FIG. 6, to a substantially fully collapsed position in which the end 128 of the rail is immediately adjacent socket 30 and socket 50 is adjacent wall 110. The adjustment and locking means 80 for incrementally moving and locking the socket means 50 with respect to socket means 30 upon installation of the console to the vehicle sunroof is now described in connection with FIGS. 8-13.

Figure 8:
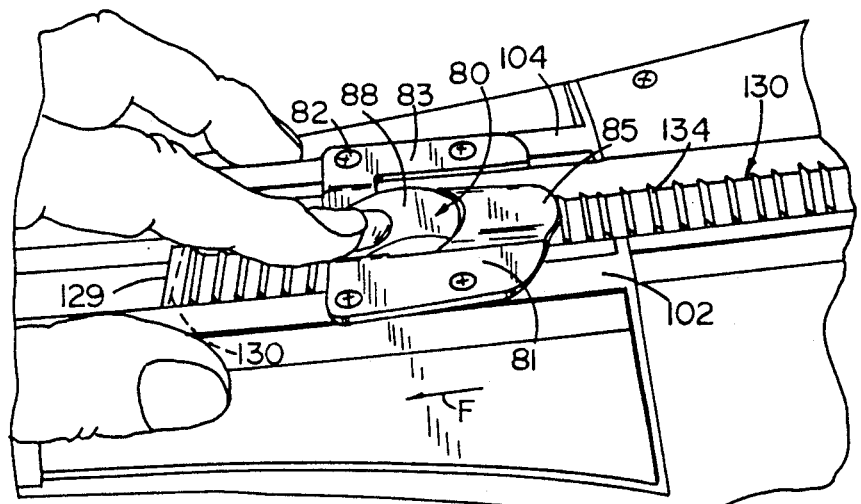
FIG. 8 is an enlarged, fragmentary, perspective view of the adjustment and locking means of the present invention shown in a first position.

The adjustment and looking means 80 comprises a ratcheted, overcenter, locking, buckle-like member which is of the same general construction as commercially available buckles of the type frequently used in connection with fastening ski boots. Such conventional adjustment and locking means are modified somewhat for this application and include mounting plates 81 and 83 mounted on opposite sides of channel 100 to the top surface of legs 102 and 104 of ohannel 100 by fasteners such as screws 82 (FIG. 8). The adjustment means 80 includes a first handle 85 which is pivotally mounted between mounting plates 81 and 83, which extend immediately adjacent the inner sides of the sides of legs 102 and 04 by a pivot pin 86 shown in phantom form in FIGS. 9 and 10. Pivotally coupled to handle 85 by a second pivot pin 87 (FIG. 9) in spaced relationship to pivot pin 86 is a spring-loaded ratchet release lever 88 having an edge 89 which is spring-loaded downwardly against the ratchet teeth 134 preventing the strap 130 from moving in a forward direction (i.e., shortening the distance between mounting sockets 30 and 50) unless pressed downwardly during installation. Handle 85 and dual pivot connections 86 and 87 allow the incremental adjustment of socket 50 with respect to socket 30 for tightly locking the console in place during the installation sequence now described.

Figure 9:
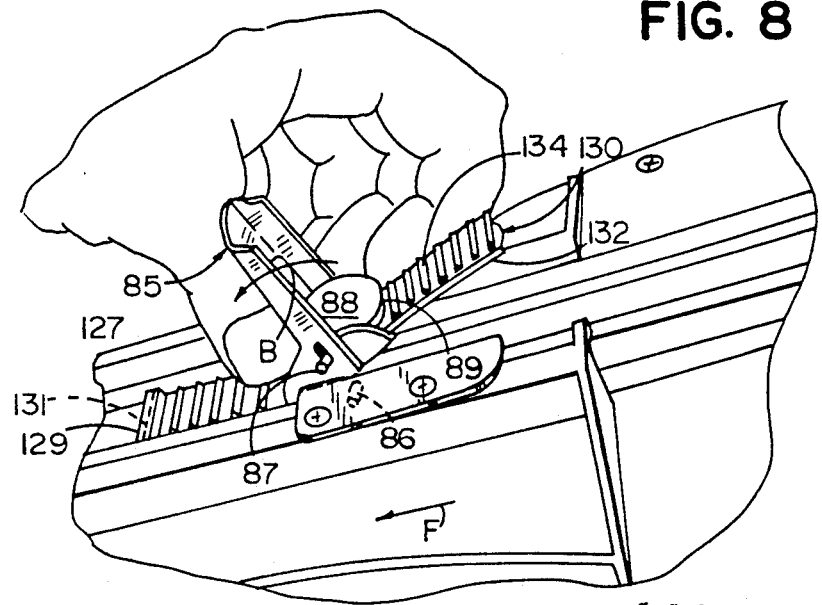
FIG. 9 is an enlarged, fragmentary, perspective view of the adjustment and locking means shown in a second position.
Figure 10:
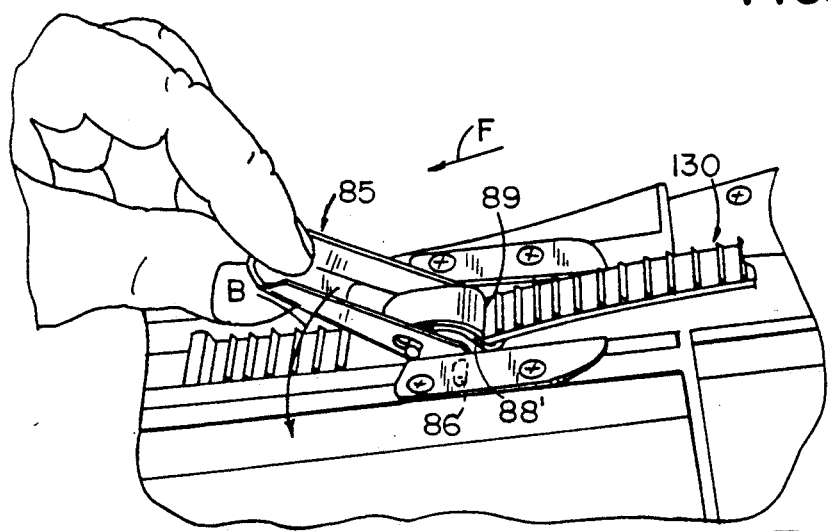
FIG. 10 is an enlarged, fragmentary, perspective view of the adjustment and locking means shown in a third position.

Referring initially to FIG. 8, prior to mounting the console 10 to the vehicle roof, socket 50 is adjusted so that there is sufficient space between sockets 30 and 50 to easily position the console in the sunroof opening as seen in FIG. 1. This is accomplished by manually depressing spring-loaded ratchet lever 88 as seen in FIG. 8 which, in turn, allows strap 130 and integrally attached socket 50 to be moved forwardly in a direction indicated by Arrow F moving the socket 50 to a position closer to wall 110 (FIG. 6) and allowing the console to be positioned in the sunroof opening. The lip 32 of socket 30 is then positioned over the forward edge of the sunroof as seen in FIG. 2. Handle 85 is then raised as indicated in the sequence of FIGS. 9 and 10 and socket 50 is manually moved rearwardly in a direction opposite Arrow F until it snugly engages the rear edge 14 of sunroof opening 15. The ratchet lever 88 allows the ratchet teeth 134 to move under lip 89 of the lever to permit this adjustment. During this adjustment, the handle 85 of the adjustment means 80 is in a fully rearward position moved in a arc indicated by Arrow B in FIGS. 9 and 10. Once the socket 50 is positioned to engage the rear edge 14 of the sunroof opening 15, the edge 89 of the push button latch 88 engages the ratchet teeth to prevent the socket 50 from moving forwardly (i.e., away from edge 14). Thus, the console is held temporarily in place in the sunroof opening.

Figure 11:
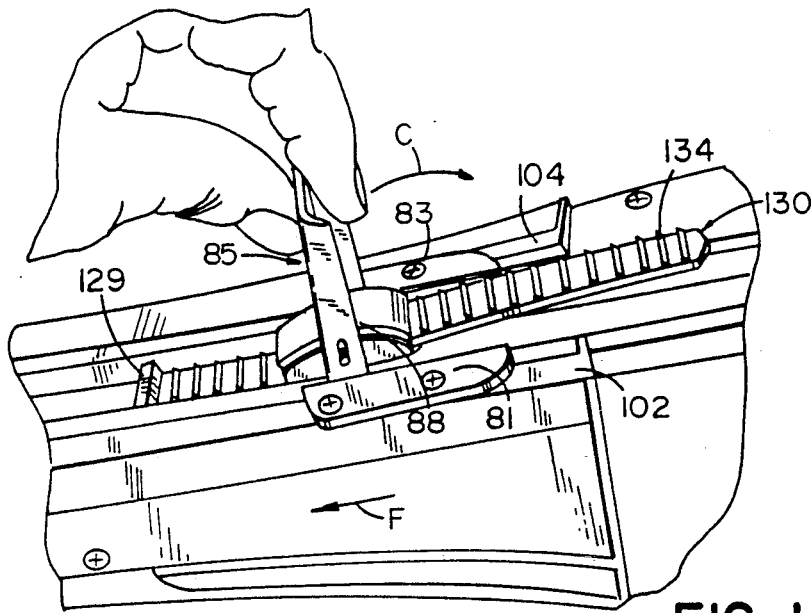
FIG. 11 is an enlarged, fragmentary, perspective view of the adjustment and looking means shown moving toward an adjusted position.
Figure 12:
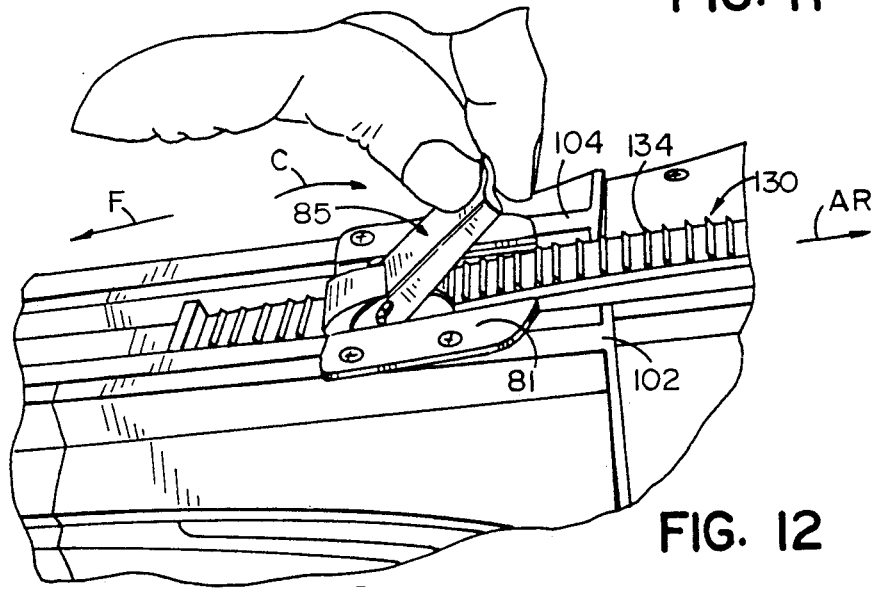
FIG. 12 is an enlarged, fragmentary, perspective view of the adjustment and locking means shown being advanced toward a locking position.
Figure 13:
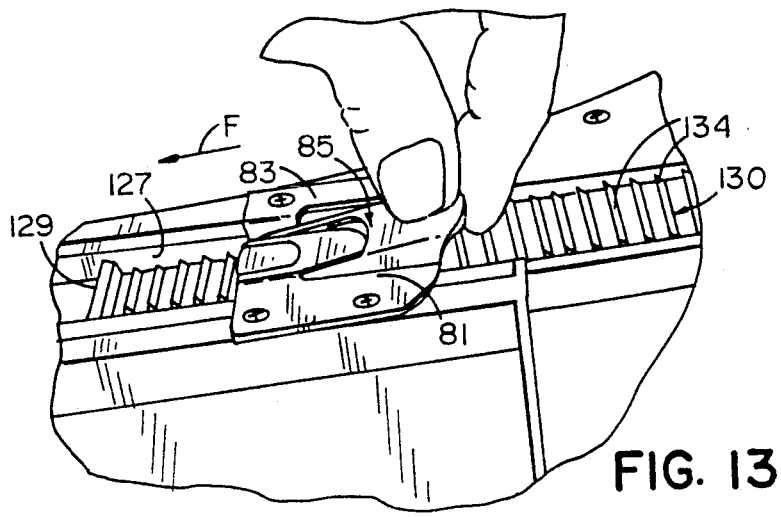
FIG. 13 shows the adjustment and looking means moved to a final locked position during the sequence of installing the console to a sunroof opening of a vehicle.

Handle 85 is then rotated with strap 130 lockably attached through control lever 88 and an underlying strap support 88' compressing strap 130 therebetween in a direction indicated by Arrow C toward the rear of the sunroof which incrementally moves strap 130 and rail 120 and socket 50 mounted thereto by pivot block 129, incrementally rearwardly as indicated by the Arrow ↑ R of FIGS. 11 and 12 to provide a compressive force between sockets 30 and 50 and the opposite edges of the sunroof opening thereby anchoring console 10 to the sunroof opening. When handle 85 is moved downwardly to a position fully flush with the edges 102 and 104 of channel 100 as illustrated in FIG. 13, the overcenter pivot 86 in relation to pivot 87 locks the adjustment means 80 in a final adjusted position as seen in FIG. 13. Thus, the adjustment means 80 provides for ease of installation of the console 10 within a vehicle sunroof opening, as well as its quick removal by releasing the ratchet lock by depressing spring lever 88 as seen in FIG. 8 to release the ratchet teeth 134 to allow socket 50 to move forwardly away from rear edge 14 of the sunroof opening thus reversing the process. The strap 130 is of sufficient thickness and strength to support the compressive force between the sockets 30 and 50 for holding the console securely. It will become apparent to those skilled in the art that various modifications to the preferred embodiment described herein can be made without departing from the spirit or scope of the invention as defined in the appended claims.

The embodiments of the invention in which an exclusive property or privilege is claimed are defined as follows:

1. A vehicle console for mounting to a vehicle having an opening for a sunroof comprising:
   a base including at least one vehicle accessory mounted thereto; and
   means for mounting said base to the sunroof opening comprising a pair of spaced mounting sockets facing in opposed directions and adjustable with respect to one another, wherein one of said sockets is mounted in fixed relationship to said base and the other of said sockets is movably mounted to said base; and wherein said mounting means includes a channel mounted to said base and wherein said other socket is mounted to a rail which is slidably mounted to said channel.

2. The console as defined in claim 1 and further including means for looking said rail to an adjusted position with respect to said channel.

3. The console as defined in claim 2 wherein said locking means includes overcenter means for incrementally moving said other socket away from said one socket to place the sockets under compression when said console is installed.

4. The console as defined in claim 3 wherein each of said sockets includes a relatively thin plate and an underlying concave mounting surface.

5. The console as defined in claim 4 wherein said rail includes a pivotally mounted strap having ratchet teeth formed on at least one side thereof and wherein said overcenter means comprises a buckle having a ratchet lever and a control handle mounted to said rail in offset pivoted relationship, and wherein said strap extends through said buckle to provide the incremental adjustment and locking of said other socket with respect to said one socket.

6. An accessory mounting system for mounting an accessory across an opening in a vehicle comprising:
 a base including at least one vehicle accessory mounted thereto; and
 a pair of spaced mounting sockets facing in opposed directions for engaging opposite edges of the opening, wherein said mounting sockets are adjustable with respect to one another with one of said sockets mounted in fixed relationship to said base and the other of said sockets adjustably mounted to said base, wherein said base includes a channel and wherein said other socket is mounted to a rail which is slidably mounted to said channel.

7. The accessory mounting system as defined in claim 6 and further including means for locking said rail to an adjusted position with respect to said channel.

8. The accessory mounting system as defined in claim 7 wherein said locking means includes overcenter means for incrementally moving said other socket away from said one socket to place said sockets under compression when said accessory is installed.

9. The accessory mounting system as defined in claim 8 wherein said rail includes a pivotally mounted strap having ratchet teeth formed on at least one side thereof and wherein said overcenter means comprises a buckle having a ratchet lever and a control handle mounted to said rail in offset pivoted relationship, and wherein said strap extends through said buckle to provide the incremental adjustment and looking of said other socket with respect to said one socket.

10. The accessory mounting system as defined in claim 9 wherein said accessory comprises a storage pouch.

11. The accessory mounting system as defined in claim 10 wherein said base includes means for releasably mounting said storage pouch thereto.

12. A removable console for mounting across a vehicle opening such as a sunroof without interfering with the operation of the sunroof, said console comprising;
 a base including at least one vehicle accessory mounted thereto; and
 a pair of spaced mounting sockets facing in opposed directions for engaging opposite edges of the opening, wherein said mounting sockets are adjustable with respect to one another with one of said sockets mounted in fixed relationship to said base and the other of said sockets adjustably mounted to said base, and wherein each of said sockets includes a relatively thin plate and an underlying concave mounting surface.

13. The console as defined in claim 12 wherein said base includes a channel and wherein said other socket is mounted to a rail which is slidably mounted to said channel.

14. The console as defined in claim 13 and further including means for locking said rail to an adjusted position with respect to said channel.

15. The console as defined in claim 14 wherein said locking means includes overcenter means for incrementally moving said other socket away from said one socket to place said sockets under compression when said console is installed.

16. The console as defined in claim 15 wherein said rail includes a pivotally mounted strap having ratchet teeth formed on at least one side thereof and wherein said overcenter means comprises a buckle having a ratchet lever and a control handle mounted to said rail in offset pivoted relationship, and wherein said strap extends through said buckle to provide the incremental adjustment and locking of said other socket with respect to said one socket.

17. The console as defined in claim 12 wherein said accessory comprises a storage pouch.

18. The console as defined in claim 17 wherein said base includes means for releasably mounting said storage pouch thereto.

19. The console as defined in claim 18 wherein said means for releasably mounting said storage pouch includes guide fingers mounted to said base and a release lever mounted to said base in spaced relationship to said guide fingers for engaging an edge of said pouch.

20. The console as defined in claim 19 and further including a tab extending from said base and engaging said pouch to urge said edge of said pouch into engagement with said release lever.

21. The console as defined in claim 20 wherein said pouch includes a zipper pocket.

22. The console as defined in claim 21 and further including a sunglass storage pocket mounted to said base.

* * * * *

UNITED STATES PATENT AND TRADEMARK OFFICE
CERTIFICATE OF CORRECTION

PATENT NO. : 5,303,970
DATED : April 19, 1994
INVENTOR(S) : Nathan W. Young et al.

It is certified that error appears in the above-indentified patent and that said Letters Patent is hereby corrected as shown below:

Column 1, line 45
    After "areas" insert --.--;

Column 2, line 30
    "looking" should be --locking--;

Column 2, line 35
    "looking" should be --locking--;

Column 4, line 30
    "look" should be --lock--;

Column 4, line 33
    After "FIG. 1" insert --.--;

Column 5, line 6
    "Strap 30" should be --Strap 130--;

Column 5, line 7
    "block 29" should be --block 129--;

Column 5, line 30
    "looking" should be --locking--;

Column 5, line 38
    "ohannel" should be --channel--;

UNITED STATES PATENT AND TRADEMARK OFFICE
CERTIFICATE OF CORRECTION

| | | |
|---|---|---|
| PATENT NO. : | 5,303,970 | |
| DATED : | April 19, 1994 | |
| INVENTOR(S) : | Nathan W. Young et al. | |

It is certified that error appears in the above-indentified patent and that said Letters Patent is hereby corrected as shown below:

Column 5, line 43
"102 and 04" should be --102 and 104--;

Column 6, line 62, claim 2
"looking" should be --locking--; and

Column 7, line 41, claim 9
"looking" should be --locking--.

Signed and Sealed this

Twenty-fifth Day of October, 1994

Attest:

BRUCE LEHMAN

*Attesting Officer*          *Commissioner of Patents and Trademarks*